Patented July 16, 1940

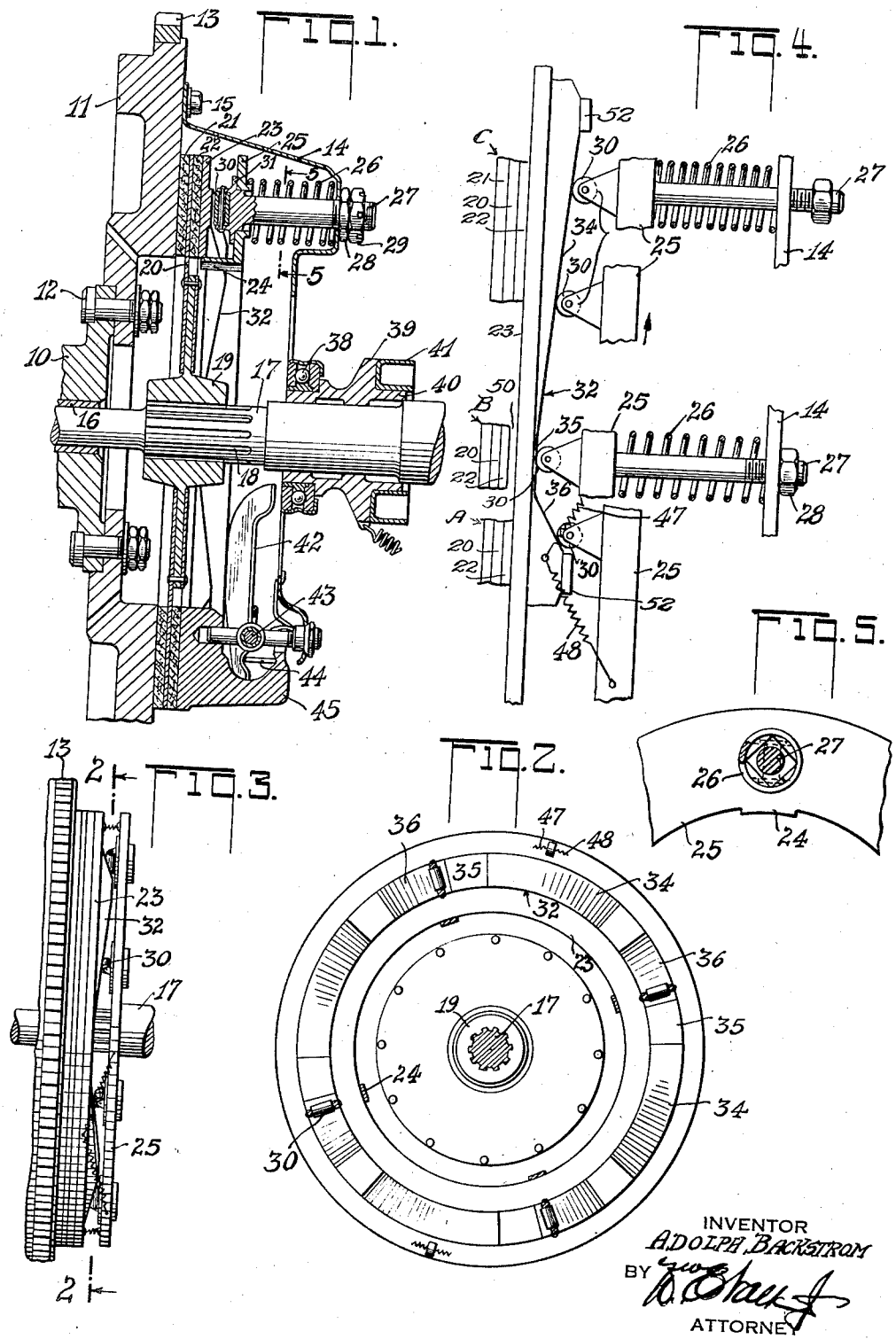

2,208,111

UNITED STATES PATENT OFFICE 2,208,111

CLUTCH MECHANISM

Adolph Backstrom, Hempstead, N. Y.

Application April 28, 1938, Serial No. 204,755

7 Claims. (Cl. 192—52)

My invention relates to clutch mechanism, and more particularly to that type of clutch adapted to releasably connect an automotive power plant to the propeller shaft which, in turn, is connected to the wheels in the conventional manner.

One of the primary objects of the invention is to provide a clutch mechanism which inherently has certain automatic features whereby clutch engagement is initially dependent on engine acceleration but wherein the clutch is arranged for both forward and reverse driving engagement to avoid any free wheeling effect.

A further object is to provide inertia clutch engaging mechanism comprising a self-contained mechanical unit free from complex interconnections and mechanism associated with the engine or with the engine intake system, as in the case of vacuum operated clutches.

Further objects of the invention are to so organize a clutch mechanism as to admit of an automatic progressive intensification of the clutching pressure once the clutch plates are placed in contact, to provide not only a smoother clutch engagement despite the sharpness with which the clutch plates may be let into engagement, but to provide for a greater torque load for the engaged clutch before slippage takes place; to provide a clutch mechanism in which the physical effort required to operate same is minimized, and to provide mechanism adapted to be applied to automotive clutches of conventional type without a complete reorganization thereof, for the purpose of making clutch engagement smoother and easier.

Other objects and advantages of the invention will be apparent in reading the annexed detailed description in connection with the drawing, in which:

Fig. 1 is a fragmentary axial section through a clutch mechanism;

Fig. 2 is a cross-section through part of the clutch mechanism, comprising a section on the line 2—2 of Fig. 3;

Fig. 3 is a side elevation of part of the clutch mechanism;

Fig. 4 is a fragmentary development of part of the clutch engaging rollers and track, showing the parts in different operative positions, and Fig. 5 is a section on the line 5—5 of Fig. 1.

One of the problems in vehicle operation particularly associated with busses having rear engines is the excessive wear of clutch plates occasioned by the inability of the operator to hear the engine and to thereby judge its speed. In order to afford maximum clutch life, it is quite essential in vehicle operation to avoid excessive clutch slippage during initial engagement of the clutch, which excessive slippage wears out the clutch plate prematurely. When the engine noise is relatively inaudible, the operator has a tendency to over-speed the engine prior to clutch engagement to make certain that he will not stall the engine. Thus, the engagement of the clutch occurs between one static plate and the engine plate driven at high speed, so that the slippage is excessive before the clutch fully engages, with wear on the plates and the development of excessive temperatures which greatly tend to shorten clutch life. This invention sets out to avoid the above operational difficulty with a minimum of complication by making actual clutch engagement responsive to engine acceleration, independent of the judgment of the operator. Ordinarily, the engine when idling has insufficient torque to start the vehicle and it is necessary to accelerate the engine to provide starting torque. As this engine acceleration is initiated, clutch engagement may properly be effected, before a wide difference in speed between the engine and the driven member accumulates. Accordingly, clutch engagement is prompt when the speed conditions are suitable and there is no long delay, yet the prompt engagement may be made smooth and easy by the use of the invention without jerking the vehicle.

In the embodiment of the invention selected for illustration, 10 indicates the end of an engine power shaft to which the conventional flywheel 11 is bolted as at 12, the flywheel carrying a starting gear 13 and a clutch hood 14 attached to the flywheel by bolts 15. Piloted at 16 in the shaft 10 is a clutch shaft 17 splined at 18 and carrying a slidable hub 19 on which is mounted the driven clutch plate 20 carrying a friction ring 21 engageable with the flywheel face and also carrying a friction ring 22 engageable with a cam plate 23. The cam plate is piloted on projections 24 integral with a pressure plate 25 rotatable with but axially movable with respect to the hood 14. A plurality of compression springs 26 are placed between and around the hood 14 and the pressure plate 25 constantly urging the latter leftwardly as shown. However, bolts 27, conveniently concentric with the springs 26, only one of the latter being shown, are rigid with the pressure plate and extend through the hood 14, a stop nut 28 with a lock nut 29 being screwed to each bolt 27 whereby the leftward movement of the bolt 27, and consequently the leftward movement of the pressure plate 25, is limited. The pressure plate carries a plurality of axially radial rollers 30 which may conveniently be journaled upon projections 31 of the left hand ends of the bolts 27. These rollers 30 are engageable with a cam face 32 formed on the right side of the cam plate 23 and as indicated, comprise a plurality of sloping faces, each set of which cooperate with one of the rollers 30. As indicated in Fig. 4, each cam set comprises a sloping drive face 34, a low zone 35 and a steeper sloping face 36, the circumferential extent of each cam set being equal to the cam circumference divided by the number of rollers 30 utilized in the assembly.

A conventional clutch release bearing 38 is axially movable upon the clutch shaft 17, a bearing carrier 39 being provided with a shouldered portion 40 engageable by a shift yoke 41, the shift yoke being connected in the conventional manner to a clutch pedal. When the pedal is depressed, the bearing 38 engages fingers, one of which is shown at 42, each fulcrumed on a bolt 43 carried by the hood 14, the finger assembly including a strut 44 engaging a pressure plate projection 45 to move the pressure plate to the right to effect complete clutch disengagement.

Since the cam plate 23 is rotationally movable relative to the pressure plate 25, means comprising springs 47 and 48 are connected to the cam plate and pressure plate to locate said plates in the position A shown in Fig. 4, wherein the roller 30 engages the slope 36 of the cam 32.

To best appreciate the operation of the clutch mechanism, the sequence of operation of the vehicle will be briefly described along with the particular clutch functionings appropriate to the respective vehicle operation phases. If the engine be stopped and the vehicle stationary, and the conventional gear shift in neutral, the engine is started affording an acceleration thereof. Due to the inertia of the cam plate 23, the same will lag behind the rotation of the flywheel as the engine is started, and the roller 30 will start to travel upward, as shown in Fig. 4, with respect to the cam plate 23. Since no load is on the engine, the springs 47 and 48 will quickly return the cam plate 23 to the position A with respect to the pressure plate. Now, to place the vehicle in motion, the engine first being idling at constant speed, the operator may declutch in the conventional manner, and shift into low gear or he may shift into gear without declutching since the clutch is not in driving engagement. No vehicle motion will take place since the cam plate 23, lightly engaged with the facing 22 of the driven plate 20, will tend to lag rotationally behind the pressure plate 25 whereby the roller 30 tends to ride off of the cam face 36 toward the position B, to the point where there is a balance between tension in spring 48 and the light friction drag due to the action of the cam slope 39, at which position the springs 26 do not enforce clutch angagement because of the limitation imposed by the stop nut 28 to leftward movement of the pressure plate. In the position B, the springs 47, 48 will pull the cam plate out of engagement with the facing of the driven plate 20, and there will be a clearance 50 between the facing of the driven plate 20 and the left side of the cam plate 23. Thus clearance or light frictional engagement may be present between the cam plate 23 and the friction ring 22, but there is no driving engagement. Now, when the operator accelerates the engine, the pressure plate 25 accelerates therewith while the driven plate 20 is stationary. Due to the inertia of the cam plate 23, the latter will lag rotationally behind the pressure plate 25, and consequently the roller 30 will advance to the cam face 34 to the position C. At this time, the engagement of the roller 30 with the cam slope 34 will wedge the cam plate leftwardly to enforce engagement of the cam plate with the friction facing of the clutch plate 20, and as the torque increases a full driving engagement will be afforded by which the engine will start to move the vehicle. So long as there is a driving relation from the engine to the vehicle, the clutch contact will be maintained, and as there is an increase in torque, the roller 30 will tend to roll up the slope 34, compressing the spring 26 and enforcing firm clutch engagement proportional to the driving torque.

It will be seen that when initial clutch engagement takes place, the springs 26 will be only slightly deformed and the clutching pressure will be proportional to this low spring pressure, affording a smooth and easy clutch engagement. Contrary to the practice in conventional clutches, wherein the clutch spring pressure must be sufficiently stiff at the outset to afford full driving torque, the clutch springs of this invention may be quite light at the point of initial engagement, but the spring pressure will be increased for full driving torque as said torque increases by virtue of the additional compression imposed upon the springs as the rollers 30 ride up the cams 34. If the engine be decelerated, whereupon the reversal of drive takes place (the vehicle driving the engine) the driven plate 20 will tend to rotate faster than the flywheel 11. Since the cam plate is in frictional engagement with the driven plate facing, the driven plate will retard the cam plate with respect to the flywheel, backing the rollers 30 off the cam slopes 34. They will back off to relieve clutching pressure, and immediately such pressure is relieved, the centralizing springs 47 and 48 will snap the cam plate back to the position A with respect to the rollers 30. By virtue of the cam slope 36, then, the clutch will be re-engaged to afford a driving connection from the vehicle to the engine. This driving connection will be maintained so long as the vehicle drives the engine. If synchronous speed be reached between the vehicle and the engine, the clutch will be substantially ineffective, but as soon as the engine be accelerated to drive the vehicle, the sequence above outlined will reoccur, the rollers 30 advancing to the position C to re-establish the driving connection from the engine to the vehicle. Or, conversely, if a driving relationship from the vehicle to the engine takes place from a speed at which the vehicle and engine are synchronous, the cam plate will advance to the position A with respect to the roller to re-establish the driving connection from the vehicle to the engine.

The clutch of this invention affords quicker starts than the conventional clutch, since the gear shift may be placed in gear with the engine idling before a start is effected. Then, to start, all that the operator need do is to accelerate the engine whereupon the clutch automatically starts the vehicle. Gear shifting from low to intermediate and high gears may also be effected without depressing the clutch pedal, if the accelerator be lifted, since at that time a drive reversal will take place and the clutch will have an instant of free wheeling action during which the gears may be shifted. Then upon re-accelerating the engine, the drive is re-initiated in the new speed ratio.

The clearance 50, when the clutch is initially set up and adjusted, may be very small and this clearance will increase gradually as the clutch rings 21 and 22 wear. The height of the cam 32, however, will be such that proper clutch action may at all times take place so long as the clutch rings 21 and 22 are effective. The clearance 50 may be initially adjusted by adjusting the stop nuts 28. It is contemplated that the springs 26 of the clutch will be of such rate that the rollers 30 will never completely ride over the high points of the cam 32 under extreme driving torque. However, stops 52 on the cam 32 may be provided, if desired, to positively prevent movement of any one of the rollers beyond that cam 32 with which it normally operates.

It will be further appreciated that no indoctrination in the use of this clutch is necessary for vehicle operators, since the conventional clutch pedal is provided and, if the operator does not desire to use the preselecting shift afforded by the clutch he can use the clutch in the conventional manner. Regardless of whether he utilizes the clutch to full advantage in his operation of the vehicle, the clutch will function to prevent an extreme overspeeding of the engine before clutch engagement occurs with consequent increase in clutch life and reduction of clutch temperatures. Likewise, the clutch will automatically afford an increasing driving pressure with increases in torque load imposed by the engine.

Although I have described the clutch mechanism as applied to an engine driven vehicle, it is obvious that its use is not confined to such vehicles and that it may be used wherever any conventional clutch is used.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a clutch mechanism, an annular driving element, an annular driven element engageable therewith, a pressure plate rotatable with the driving member, resilient means between the pressure plate and the driving member urging the plate toward the driven member, an annulus interposed between the pressure plate and the driven member and engageable with the latter, an undulating cam carried by the annulus, rollers journalled on the pressure plate engaging the surface of said cam, said pressure plate being axially movable toward and away from the driven member, means for moving the pressure plate axially, and means to limit the movement of the pressure plate toward the driven member comprising adjustable devices connecting the pressure plate and driving member allowing freedom of movement of the pressure plate away from the driven member.

2. In a clutch mechanism, a driven member, a plate engageable therewith, a driving member floatingly carrying said plate, means responsive to acceleration of said driving member for enforcing driving engagement between said plate and driven element, and means responsive to overrun of the driving member by the driven member for enforcing said driving engagement.

3. In clutch mechanism, an annular member, an annular plate frictionally engageable therewith carrying cam surfaces, a second annular member upon which said plate is loosely mounted, and cam engagers on said second member engageable with said cam surfaces to enforce contact of said plate with said first member and driving relation therebetween, said cam surface including opposite slopes, and resilient means normally centralizing said plate relative to said second member in such a position that said engagers contact one of the slopes of respective cam surfaces for drive from one member to the other, said members being relatively rotatable to overcome said resilient means, and to effect contacts of said engagers with respective other cam slopes and drive from the other member to the one.

4. In a clutch mechanism comprising a driving member, a driven member, and a pressure plate carried by the driving member and resiliently urged toward the driven member; means to limit the movement of the pressure plate toward the driven plate, a floating plate between the driven member and said pressure plate engageable with the member and movable with and relative to the pressure plate, said plates having cams and cam engagers and resilient means urging said plates toward one another, said cams having relatively reversed slopes whereby, upon acceleration of the driving member the floating plate lags rotationally due to its inertia causing axial shift thereof due to contact of a cam engager and one of said cam slopes, and whereby, upon overrun of the driving member by the driven member, the floating plate advances rotationally therewith relative to the driving member, enforcing engagement of said cam engager with the other cam slope to effect axial movement of the floating plate with the driven plate and driving engagement therebetween.

5. In a clutch mechanism comprising a driving member, a driven member, and a pressure plate carried by the driving member and resiliently urged toward the driven member; means to limit the movement of the pressure plate toward the driven plate, a floating plate between the driven member and said pressure plate engageable with the member and movable with and relative to the pressure plate, said plates having cams and cam engagers and resilient means urging said plates toward one another, said cams having relatively reversed slopes whereby, upon acceleration of the driving member the floating plate lags rotationally due to its inertia causing axial shift thereof due to contact of a cam engager and one of said cam slopes, and whereby, upon overrun of the driving member by the driven member, the floating plate advances rotationally therewith relative to the driving member, enforcing engagement of said cam engager with the other cam slopes to effect axial movement of the floating plate with the driven plate and driving engagement therebetween, said pressure plate and floating plate including a resilient connection normally urging engagement of said cam engager with said other cam slope.

6. In a clutch mechanism comprising a driving member, a pressure plate rotatable therewith and axially movable relative thereto, a driven plate, springs urging the pressure plate away from the driving member and toward the driven plate, means limiting the movement of the pressure plate toward the driven plate, a plurality of cam followers circumferentially disposed on that side of the pressure plate toward the driven plate, a cam ring having an undulating cam surface engaged with the cam followers and having a face engageable with said driven plate, the number of cam undulations being the same as the number of cam followers, said cam ring being rotatable with and with respect to said pressure plate and said undulations being of such form, that when the engagers contact the cam ring between cam lobes said cam ring moves toward the pressure plate and away from the driven plate, and that when the engagers contact the cam lobes on either side of said between-lobes position the cam ring is moved away from the pressure plate and toward the driven plate, and resilient means normally urging the cam ring to a position whereat the engagers contact the lobes toward one side of said between-lobes position.

7. In a clutch mechanism responsive in its engagement to acceleration of a driving member relative to a driven member, a floating cam-carrying inertia member movable with and with respect to the driving member, the latter having a cam engager associated therewith, said cam comprising a low zone and relatively reversed slopes blending into the low zone, the cam carrying member, when said low zone is engaged with the cam engager, being clear of the driven member, and when either cam slope engages the cam engager, being forced into driving engagement with the driven member in virtue of said slope, and resilient means normally urging said cam carrying member to a position wherein said cam engages one of said cam slopes.

ADOLPH BACKSTROM.